United States Patent
Rönpagel et al.

(10) Patent No.: US 11,920,701 B2
(45) Date of Patent: Mar. 5, 2024

(54) METHOD FOR PRODUCING A NUMBER OF PIPES HAVING A PREDEFINED PIPE DIAMETER, PIPE, AND PIPING SYSTEM

(71) Applicant: Minimax Viking Research & Development GmbH, Bad Oldesloe (DE)

(72) Inventors: Andreas Rönpagel, Isernhagen (DE); Jan Ehlers, Timmendorfer (DE); Jendrik Schütt, Bad Oldesloe (DE); Hanjo Diederley, Timmendorfer Strand (DE); Kai Zeugner, Groß Pankow (DE)

(73) Assignee: Minimax Viking Research & Development GmbH, Bad Oldesloe (DE)

( * ) Notice: Subject to any disclaimer, the term of this patent is extended or adjusted under 35 U.S.C. 154(b) by 544 days.

(21) Appl. No.: 17/252,251

(22) PCT Filed: Jun. 27, 2019

(86) PCT No.: PCT/EP2019/067140
§ 371 (c)(1),
(2) Date: Dec. 14, 2020

(87) PCT Pub. No.: WO2020/002498
PCT Pub. Date: Jan. 2, 2020

(65) Prior Publication Data
US 2021/0262594 A1  Aug. 26, 2021

(30) Foreign Application Priority Data
Jun. 27, 2018  (DE) .................... 10 2018 115 533.6

(51) Int. Cl.
*B23K 31/00* (2006.01)
*A62C 35/68* (2006.01)
(Continued)

(52) U.S. Cl.
CPC .......... *F16L 13/0263* (2013.01); *A62C 35/68* (2013.01); *B23K 31/027* (2013.01); *F16L 58/1009* (2013.01); *B23K 2101/10* (2018.08)

(58) Field of Classification Search
CPC ... F16L 13/0263; F16L 58/1009; F16L 13/02; A62C 35/68; B23K 31/027;
(Continued)

(56) References Cited

U.S. PATENT DOCUMENTS

| 1,966,403 A | 7/1934 | Durham | |
| 2,797,304 A * | 6/1957 | Donelan | B23K 9/23 219/118 |

(Continued)

FOREIGN PATENT DOCUMENTS

| CA | 2837428 A1 * | 3/2014 | ............ B23D 21/00 |
| CN | 102922099 A * | 2/2013 | |

(Continued)

OTHER PUBLICATIONS

International Search Report (with English translation), International Application No. PCT/EP2019/067140, 7 pages (dated Sep. 17, 2019).

*Primary Examiner* — Kiley S Stoner
(74) *Attorney, Agent, or Firm* — Perkins Coie LLP (57) ABSTRACT

The invention relates to a method for producing a number of pipes (100) with a predetermined pipe diameter. The method includes feeding multiple pipe parts (101, 102) with the predetermined pipe diameter to a welding station (53), aligning in each case a first pipe part (101) and a second pipe part (102) coaxially with respect to one another and axially adjacent to one another, welding the pipe parts (101, 102) by means of a fully encircling weld seam (109) to form a pipe run (104), conveying the pipe run (104) to a cutting station (57) in a machine direction (A) downstream of the welding (Continued)

station (53), and cutting off the number of pipes (100) in a respectively designated length from the pipe run (104).

13 Claims, 4 Drawing Sheets (51) Int. Cl.
 *B23K 31/02* (2006.01)
 *F16L 13/02* (2006.01)
 *F16L 58/10* (2006.01)
 *B23K 101/10* (2006.01)
(58) Field of Classification Search
 CPC .... B23K 2101/10; B23K 37/053–0538; B23K 2101/04–125
 USPC ............................ 228/49.3, 44.5, 178, 160
 See application file for complete search history.

(56) References Cited

U.S. PATENT DOCUMENTS

| | | | |
|---|---|---|---|
| 2,915,324 A | 12/1959 | Jackson | |
| 4,132,339 A * | 1/1979 | Gurevich | B23K 31/027 |
| | | | 228/103 |
| 4,323,223 A | 4/1982 | Noll | |
| 10,413,765 B2 | 9/2019 | Rönpagel et al. | |
| RE48,284 E | 10/2020 | Rönpagel et al. | |
| 2002/0153355 A1* | 10/2002 | Kazama | B23K 37/08 |
| | | | 219/78.15 |
| 2003/0091395 A1 | 5/2003 | Stockstill | |
| 2007/0075087 A1 | 4/2007 | Knight | |
| 2015/0174661 A1* | 6/2015 | Brandstrom | B23K 37/0276 |
| | | | 228/9 |
| 2015/0322288 A1 | 11/2015 | Wasserfallen et al. | |
| 2017/0182605 A1* | 6/2017 | Rajagopalan | B23K 9/32 |
| 2018/0029154 A1* | 2/2018 | Rajagopalan | B23K 9/0286 |
| 2018/0031152 A1* | 2/2018 | Rajagopalan | B23K 9/0282 |
| 2018/0117661 A1* | 5/2018 | Konopacki | B23K 9/235 |
| 2018/0117718 A1* | 5/2018 | Rajagopalan | B23K 9/0284 |
| 2019/0358477 A1 | 11/2019 | Rönpagel et al. | |
| 2021/0154506 A1 | 5/2021 | Rönpagel et al. | |
| 2021/0254777 A1 | 8/2021 | Röpagel et al. | |

FOREIGN PATENT DOCUMENTS

| | | | | |
|---|---|---|---|---|
| CN | 104907673 A | * | 9/2015 | |
| CN | 204717162 U | * | 10/2015 | |
| CN | 105014187 A | * | 11/2015 | ............. B23K 33/00 |
| CN | 106541206 A | * | 3/2017 | |
| CN | 106735779 A | * | 5/2017 | ............... B23K 9/02 |
| CN | 107052656 A | * | 8/2017 | |
| CN | 109382601 A | * | 2/2019 | ............. B23K 37/00 |
| CN | 109604923 A | * | 4/2019 | ........... B23K 37/053 |
| CN | 110076499 A | * | 8/2019 | ............. B23K 37/00 |
| DE | 1 627 629 | | 10/1970 | |
| DE | 2 69 807 A1 | | 7/1989 | |
| DE | 10 2010 027 182 A1 | | 1/2012 | |
| DE | 10 2014 102 621 A1 | | 8/2015 | |
| EP | 0036571 | | 9/1981 | |
| EP | 0344896 | | 12/1989 | |
| EP | 0 402 648 A2 | | 12/1990 | |
| EP | 1 270 132 | | 1/2003 | |
| EP | 2 623 163 A1 | | 8/2013 | |
| EP | 2 766 653 B1 | | 11/2016 | |
| EP | 3063236 B1 | * | 7/2017 | ............... B32B 1/02 |
| FR | 2311980 | | 12/1976 | |
| JP | H07116729 A | * | 5/1995 | |
| KR | 2019 0042233 | | 4/2019 | |
| WO | WO 2020/002486 A1 | | 1/2020 | |
| WO | WO 2020/002502 A1 | | 1/2020 | |
| WO | WO 2020/002542 A2 | | 1/2020 | |
| WO | WO 2022/136644 | | 6/2022 | |

* cited by examiner

METHOD FOR PRODUCING A NUMBER OF PIPES HAVING A PREDEFINED PIPE DIAMETER, PIPE, AND PIPING SYSTEM

PRIORITY CLAIM AND INCORPORATION BY REFERENCE

This application is a 35 U.S.C. § 371 application of International Application No. PCT/EP2019/067140, filed Jun. 27, 2019, which claims the benefit of German Application No. 10 2018 115 533.6 filed Jun. 27, 2018, each of which is incorporated by reference in its entirety.

TECHNICAL FIELD

The present invention relates to a method for producing a number of pipes with a predetermined pipe diameter. In particular, the invention relates to a method for producing a number of polymer-enhanced pipes with a predetermined pipe diameter. The invention furthermore relates to a pipe produced in particular in such a method, and to a pipeline system of a fire extinguishing installation having a number of such pipes.

BACKGROUND AND SUMMARY OF THE INVENTION

Pipes are a central component of fire extinguishing installations. It is not uncommon for pipelines of several kilometers in length to be installed in objects in order to be able to supply extinguishing agent to sprinklers, extinguishing nozzles and the like in the event of a fire.

Methods for producing pipelines for fire extinguishing installations are generally known. Pipes in fire extinguishing installations are subject to the particular challenge that they are installed unused in objects for very long periods of time and, in the event of operation, must reliably and assuredly perform their task of transporting fluid.

For example, fire extinguishing installations in which the pipeline systems carry extinguishing liquid even in the standby state, and alternatively those which do not yet carry extinguishing liquid in the sprinkler lines in the standby state, are widely used. In the case of the latter systems in particular, the susceptibility to corrosion inside the pipes is a particular challenge, which is why efforts have been made in the prior art to reduce the corrosion resistance of pipes or pipeline elements, in particular for fire extinguishing systems. In order to avoid the problem of corrosion within fire extinguishing installations, alternative approaches have been developed in which large parts of the pipeline system, and with them the majority of the installed pipes, are in the standby state filled not with extinguishing fluid but with gases.

The costs for the systems from the prior art are sometimes considerable, since on the one hand the use of corrosion-resistant pipes or complex passivation processes were necessary, and on the other hand high installation costs were necessary for the charging of the respective pipeline systems with gas.

EP Application 1 2153 964 which published as EP 2 623 163 A1 and EP Application 1 2798 290 which published as EP 2 766 653 each describe systems and methods which achieve a significant improvement over the prior art. Said documents describe for the first time the use of polymer enhancement by autodeposition on the inside of the pipe in pipeline elements of fire extinguishing installations. The polymer enhancement described in said documents is extremely robust owing to the attained ionic bonding of a polymer-based coating material to the pipe surface and allows the use of simple metals that are not yet corrosion-resistant per se, in particular low-alloy steel types. At the same time, very low corrosion development, to the point of complete corrosion resistance, is achieved even over relatively long observation periods.

Furthermore, the pipes, in particular of fire extinguishing installations, are required to oppose the transported fluid, for example extinguishing agent, with the lowest possible flow resistance. For this purpose, the inner surface of the pipes must be as smooth as possible, which in turn also benefits the corrosion resistance. For the reasons mentioned above, the manufacture of fire extinguishing installations in particular is of great importance. At the same time, there is an endeavor by the industry to carry out the production of pipes in an economically efficient manner, which leads to a conflict of aims specifically with regard to the required corrosion resistance.

For practical installation at the respective location of use, the pipeline systems, which are often several kilometers in length, require individual provision of pipes with different pipe lengths and different pipe diameters. In order to as far as possible eliminate the need to alter the pipes to their designated pipe length at the installation site of the pipelines, great effort is put into the advance planning of the pipeline system.

In known methods for producing pipes, pipe parts with predetermined lengths are provided as starting material. The pipeline systems have then been pieced together from the pipes of standard length. At the locations where pipe parts shorter than the pipe parts of standard length have locally been required, the pipe parts have been shortened to the designated lengths proceeding from the pipe parts of standard length, and the remaining spare pieces or pipe remnants have been sorted out as waste. If, for example, a total of ten pipe parts with a respective length of five meters have been required for the installation of a pipeline system of a fire extinguishing installation, whereas the standard pipe length is for example six meters or more, one meter or more of waste has been produced from each of ten standard pipe parts.

From a macroeconomic aspect, this is considered overall to be disadvantageous.

Accordingly, the invention was based on the object of specifying a method of the type indicated at the outset which allows more economical production of pipes with a predetermined pipe diameter, in particular pipes for pipeline systems of fire extinguishing installations.

The invention achieve the object on which it is based in the case of such a method in that the method comprises the steps:
 feeding multiple pipe parts with the predetermined pipe diameter to a welding station,
 aligning in each case a first pipe part and a second pipe part coaxially with respect to one another and axially adjacent to one another,
 welding the pipe parts by means of a fully encircling weld seam to form a pipe run,
 conveying the pipe run to a cutting station in a machine direction downstream of the welding station, and
 cutting off the number of pipes in a respectively designated length from the pipe run.

At first, it appears counterintuitive to firstly cohesively connect multiple pipe parts by welding if they are subsequently immediately separated again, because the pipes processed in this way will in many cases, after being cut off from the pipe run, have the encircling root of the weld seam on the inside, which, based on findings in the prior art, has been found to result in a deterioration in the flow resistance and has therefore been considered to be undesirable. However, the inventors have surprisingly found that the flow resistance is not adversely affected to an inadmissibly great degree if the root of the weld seam forms in a fully encircling manner in the interior of the pipeline, because the root of the weld seam creates a relatively smooth contour transition from one pipe part to the next pipe part. Furthermore, the material savings are dramatically noticeable. If, to use the numerical example described above from the prior art, for example in the case of the production of ten pipes of five meters in length from ten pipes of six meters in length, scrap totaling ten times one meter, that is to say ten meters of pipe length, was produced, the method according to the invention is significantly more material-saving: Not ten pipes but only nine pipes are required, which are welded to form a pipe run 54 m in length, from which, in turn, 10 parts each of 5 m in length can be cut off, such that only one piece of 4 m in length remains as "waste". in this case without waste. The invention is based on the approach that a virtually endless pipe run is first generated at the welding station by the joining-together of pipe parts in series. Pipes of any lengths can then be cut off from this pipe run in the cutting station connected downstream, without waste being generated in each case. The invention is furthermore also based on the recognition that the advantages achieved in this way far outweigh the disadvantages, previously perceived as prejudice, of the introduction of the additional weld seam.

Advantageous refinements will emerge from the statements below.

The method is preferably further developed in that, after the cutting-off of the number of pipes, a residual pipe part remains, and the method comprises the step:—transferring the residual pipe part into a buffer store.

This makes it possible for even the residual pipe part that remains as waste to still be able to be utilized in later implementations of the method. In this way, the method permits substantially waste-free processing of the fed pipe parts.

Preferably, the pipe parts with the predetermined pipe diameter are kept available in a pipe store and at least one of the first and second pipe parts is fed from a pipe store to the welding station for the method. The method further preferably comprises the step:
checking whether a residual pipe part of the predetermined diameter is available in the buffer store, and if so:
feeding a pipe part from the pipe store and feeding the residual pipe part from the buffer store to the welding station.

The method according to the invention is particularly preferably carried out in batch-based fashion, wherein a batch run comprises a designated number of pipes with the predetermined diameter to be produced, and the method furthermore comprises the steps:
determining a total length of the designated number of pipes,
determining a length of the residual pipe part in the buffer store, if present, and
determining a required quantity of pipe parts to be fed from the pipe store as:
total length of the designated number of pipes minus the length of the residual pipe part, divided by the predefined pipe length of the pipes in the pipe store.

The method according to the invention is implemented particularly economically if, for example, for a planned fire extinguishing installation based on a predefined pipeline system, it is calculated how many pipes are required, and in what designated lengths, for one or more predetermined diameters. Then, preferably all of the pipes and their respective designated lengths are grouped according to predetermined diameters and produced in groups in batch runs. In this way, work can be carried out substantially without waste, because residual pipe parts still remaining in the buffer store after the completion of an order can also be reused for subsequent orders.

The invention therefore also allows a high degree of automation of the manufacturing process.

In preferred refinements of the method, the pipe parts each have a wall, and the wall has in each case an encircling edge surface, wherein the aligning step comprises:
aligning the encircling edge surface of the first pipe part and the encircling edge surface of the second pipe part with one another, and wherein the welding step comprises:
welding the first pipe part to the second pipe part along the encircling edge surfaces, wherein a fully encircling weld seam is generated which has a root extending on the inside of the pipe run.

In this regard, the invention is also based on the recognition that the pipe run, by applying a weld seam which extends in fully encircling fashion in the interior of the pipe run, that is to say in a circle, by contrast to the prior art, the weld seam root generates an advantageous surface geometry which allows complete wetting of the entire inner surface of the pipe run, including of a transition region from the first to the second pipe part, with the polymer-based protective layer. The root of the weld seam extending in fully encircling fashion ensures a significantly smoother contour transition between the first and the second pipe part in relation to the prior art, such that it is hereby made possible for the first time, using polymer enhancement, for relatively complex pipe runs or pipes, as only single-part pipes, to be provided with long-term corrosion resistance. The smooth contour transition between the first and second hollow bodies offers advantages for any type of polymer enhancement, but makes the pipeline element very particularly suitable for polymer enhancement by means of autodeposition, because the flow conditions in the pipe interior are disrupted to a lesser extent owing to the smooth contour transition. The alignment of the edge surfaces with one another is to be understood to mean that the edge surface of the first hollow body and the edge surface of the second hollow body are oriented and spaced apart relative to one another in such a way that the two hollow bodies can be welded to one another along the edge surfaces.

Furthermore, the edge surfaces of the first and second pipe parts preferably have in each case an encircling inner edge, and the welding step comprises: forming the weld seam with a thickness which completely encompasses the two inner edges, wherein the root of the weld seam protrudes radially inward from an inside of the wall of the first and/or second pipe part by a predetermined maximum value, wherein the predetermined maximum value preferably amounts to 0.7 times the wall thickness of the hollow bodies or less. By means of the thus ensured but only slight protrusion of the weld seam into the interior of the pipe run or pipe, it can be easily ensured that both edge surfaces have actually been completely encompassed and no cavities or the like remain in the region of the inner edges of the hollow bodies after the welding process. By limiting the maximum height by which the weld seam protrudes inward, it is ensured that the weld seam does not generate any undesired increased flow resistance, which would reduce the C-factor, that is to say the. The C-factor is calculated in accordance with generally known principles using the Hazen-Williams equation.

It is furthermore preferable if the cutting-off step comprises:
generating at least one of the edge surfaces of the residual pipe part by means of cutting, preferably by means of plasma cutting. Plasma cutting in particular has proven to be a highly efficient way of generating the edge surfaces on the hollow bodies. Precise cuts are possible at high speed and thus with high economic efficiency. Plasma cutting is also suitable for automation of the manufacturing process.

In a further preferred embodiment, the method comprises the step:
cleaning at least one of the encircling edge surfaces, preferably all of the encircling edge surfaces of the pipe parts for welding, before the welding, preferably after the cutting. The cleaning of the edge surfaces comprises in particular the removal of burrs and loose particles, but also of dirt. If the upstream cutting of the edge surfaces was performed by plasma cutting, a metal oxide layer has sometimes formed in the region of the edge surface as a result. It has been recognized in the context of the invention that the cleaning of the edge surface and in particular the removal of metal oxides from the surface of the pipe parts in the region of the edge surfaces leads to a much more uniform weld pattern and results in a more uniform shape of the root of the weld seam in the interior of the pipe run or pipe. A further advantage of this embodiment is that, firstly, the cleaning of the edge surfaces can be automated with little outlay, in particular if it is performed using a rotationally driven brush. Secondly, the cleaning of the edge surfaces per se also allows an automated welding process, since this is much easier to control in view of the cleaned edge surfaces that have been freed of metal oxides.

It is furthermore preferable if the cleaning step comprises removing metal oxides and loose particles from the at least one edge surface, preferably by brushing.

In a further preferred embodiment, the method is a method for producing a designated number of polymer-enhanced pipes, comprising the step:
applying a polymer-based layer on the inside of the pipes, wherein the polymer-based layer completely covers the inside of the pipes and the root of the weld seam.

The application of the polymer-based layer is performed in the method according to the invention preferably by dipping of the pipes into a dip bath which contains a corresponding coating material. The advantage of a dip coating process is that, in addition to coating of the particularly sensitive interior region of the pipeline elements, the outer surface is also at least substantially coated in the same coating process.

Preferably, the pipe parts are formed from a metal suitable for chemical autodeposition, in particular from a ferrous and/or zinc-containing metal, and the step of applying the polymer layer on the inside of the pipe comprises: coating, in particular by means of chemical autodeposition, preferably by dipping of the pipe into a dip bath which contains a polymer-based chemical autodeposition material.

One advantage of using an autodeposition method is inter alia that a uniform, highly corrosion-resistant coating with simultaneously small layer thicknesses is achieved. In particular with the use of a dipping process, a coating can form wherever the pipeline element is wetted. The advantage according to the invention of the optimized weld seams comes to bear again here, because cavities and the like are substantially avoided as a result of the complete, uniform formation of the weld seam in the preferred embodiments described above. A further advantage can be seen in the fact that, owing to the autodeposition layer and the corrosion protection arising therefrom, thinner pipe wall thicknesses are possible that have previously been ruled out owing to a risk of rusting through. Smaller wall thicknesses, in turn, have the advantage that the surface sections occupied by the weld seams in the pipe interior can be further minimized, and that altogether less material has to be applied by welding.

The autodeposition material preferably comprises polymer constituents which are ionically bonded to the wall of the hollow bodies and to the root of the weld seam, and is preferably present as an aqueous emulsion or dispersion.

The autodeposition material is preferably acidic in its liquid phase, and particularly preferably has a pH in a range from 1 to 5, and particularly preferably a starter material in the form of metal halides. In particular iron halides, particularly preferably iron(III) fluoride, are proposed as metal halides for ferrous metals. The metal halides, by reacting on the surface of the pipe parts, release metal ions, in the case of a ferrous pipe part that is to say in particular iron ions, in particular $Fe2+$ ions, which destabilize the polymer constituents in the autodeposition material, resulting in an accumulation on the metal surface of the weld seam and of the pipe parts.

The autodeposition material preferably has, as polymer constituent, autodepositionable polymers preferably selected from the list comprising:
i) epoxides,
ii) acrylates,
iii) styrene acrylates,
iv) epoxy acrylates,
v) isocyanates, especially urethanes, such as polyurethanes,
vi) polymers with a vinyl group, for example polyvinylidene chloride, or
iv) a combination of two or more of i), ii) or iii), which are preferably crosslinked to one another, more preferably via an isocyanate, particularly preferably via a urethane.

The step of dipping into the autodeposition material is preferably performed in one or more dipping processes and is continued until such time as the polymer-based layer applied to the inside of the pipe has a thickness in a range from 7 µm to 80 µm, preferably a thickness in a range from 7 µm to 30 µm. The stated values relate to the dry layer thickness and in particular to an increase in thickness relative to the uncoated state. It has been found that even layer thicknesses in a range from 7 µm can be applied with the method according to the invention in such a way that complete coverage of the inner surface of the pipeline element and also of a major part of the outer surface, if correspondingly dipped, is realized.

The invention has been described above with reference to the method according to the invention in a first aspect. In a second aspect, the invention also relates to a pipe, in particular produced in a method according to one of the preferred embodiments described above, which pipe has:
a first pipe part,
a second pipe part, wherein the pipe parts are aligned coaxially with respect to one another and connected by means of an encircling weld seam, wherein the weld seam has a root extending on the inside of the pipe, and preferably a polymer-based layer on the inside of the pipe, wherein the polymer-based layer completely covers the inside of the pipe and the root of the weld seam. The pipe according to the invention adopts the advantages and preferred embodiments of the method according to the invention in their entirety, for which reason reference is made to the above statements to avoid repetition.

The root of the weld seam preferably completely encompasses the edge surfaces that are still present before the welding of the two pipe parts, and protrudes radially inward from an inside of the wall of the first and/or second pipe part by a predetermined maximum value, wherein the predetermined maximum value preferably amounts to 0.7 times the wall thickness of the hollow bodies or less.

The pipe parts are preferably formed from a metal suitable for chemical autodeposition, in particular from a ferrous and/or zinc-containing metal, and the polymer-based layer contains a metallic constituent, preferably in the form of metal ions, that is to say particularly preferably in the form of iron ions in the case of a ferrous metal. The iron ions trapped between the polymer constituents ensure that the coating material adheres strongly to the pipe parts.

The autodeposition material preferably has, as polymer constituent, autodepositionable polymers preferably selected from the list comprising:
i) epoxides,
ii) acrylates,
iii) styrene acrylates,
iv) epoxy acrylates,
v) isocyanates, especially urethanes, such as polyurethanes,
vi) polymers with a vinyl group, for example polyvinylidene chloride, or
iv) a combination of two or more of i), ii) or iii), which are preferably crosslinked to one another, more preferably via an isocyanate, particularly preferably via a urethane.

The polymer-based layer furthermore preferably has a thickness in a range from 7 μm to 80 μm, preferably a thickness in a range from 7 μm to 30 μm.

The predetermined diameter of the produced pipes and pipe parts used for them preferably lies in a range from DN15 to DN300, preferably from DN32 to DN 80. Alternatively, the nominal width ranges in the inch system lie in a range from ½" (NPS) to 12" (NPS), particularly preferably in a range from 1¼" (NPS) to 3" (NPS).

The pipe according to the invention described above is preferably used in a pipeline system of a fire extinguishing installation which has a number of pipes which are coupled to one another, wherein one, multiple or all pipes are designed in accordance with one of the preferred embodiments described above. In further aspects, the invention accordingly relates both to a pipeline system of a fire extinguishing installation, having a number of pipes which are coupled to one another, and to the use of a pipe in a pipeline system of a fire extinguishing installation, in which a number of pipes are coupled to one another, wherein in each case one, multiple or all pipes is or are designed in accordance with one of the preferred embodiments described above.

BRIEF DESCRIPTION OF THE DRAWINGS

The invention will be described in more detail below with reference to the appended figures and on the basis of preferred exemplary embodiments.

MODE(S) FOR CARRYING OUT THE INVENTION

Figure 1:
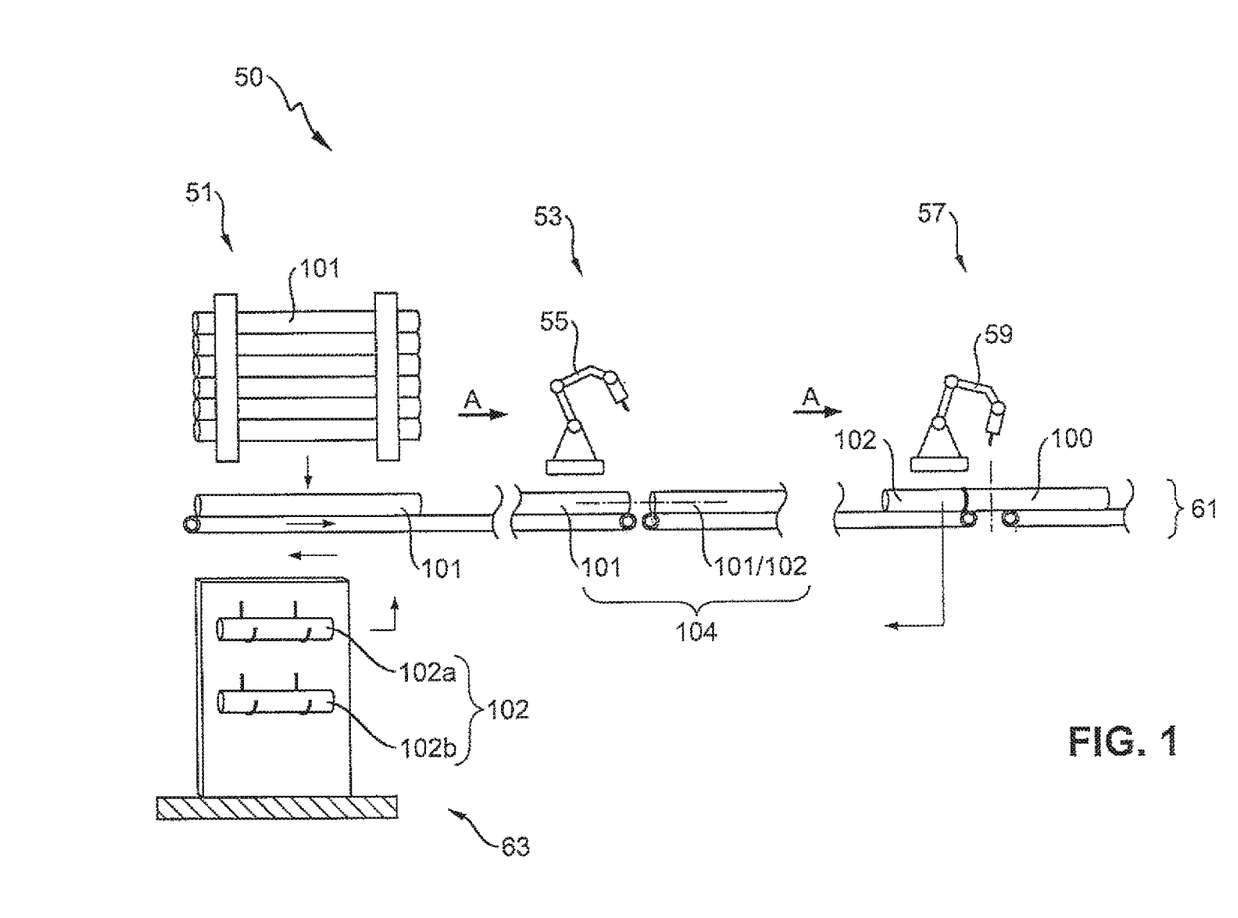
FIG. 1 shows a schematic layout of an installation for carrying out the method according to the present invention.

FIG. 1 shows an installation 50 for producing pipes with a predetermined diameter and respectively designated pipe lengths. The installation 50 has a pipe store 51 in which a multiplicity of pipe parts 101 with a standard length of for example 6 m are stored.

The installation also has a welding station 53. The welding station has at least one welding tool 55, which is configured to weld together pipe parts 101, 102 that are fed to it, such that a fully encircling weld seam 109 (cf. FIG. 4) is formed which connects the adjacent pipe parts 101, 102 to one another such that a root (112) of the weld seam is formed on the inside of the pipe parts 101, 102.

The welding station 53 is configured to form a virtually endless pipe run 104 from the individual pipe parts 101, 102 that are fed to it. In preferred embodiments, the welding tool 55 may be designed to be manually operable, partially automated or fully automated.

The installation 50 furthermore has a cutting station 57. The cutting station 57 has a parting tool 59, for example a device for plasma cutting. The cutting station 57 is configured to use the cutting tool 59 to cut off pipes 100 in a respectively designated length from the pipe run 104 that is fed to it.

The installation 50 furthermore has a conveying section 61 which is configured to convey the pipe parts 101, 102 in a machine direction A downstream from the pipe store 51, firstly to the welding station 53 and then to the cutting station 57. The conveying section 61 may be in the form of a singular device or in the form of a combination of several devices cooperating with one another. For example, the pipe parts 101, 102 or pipe runs 104 and pipes 100 are transported by means of belt conveyors or the like.

The installation 50 furthermore has a buffer store 63. The buffer store 63 is configured to temporarily accommodate residual pipe parts 102 that remain after a number of pipes 100 required for an order have been cut off from the pipe run 104.

If a number of pipes 100 with a predetermined diameter are to be produced with the installation 50, the remaining pipe parts 102 situated in the buffer store can be removed from there and fed to the conveying section 61 upstream of the welding station 53 in order to be welded together with the pipe parts 101 situated in the pipe store to form a pipe run.

If the buffer store 63 does not have any residual pipe parts 102 in the predetermined pipe diameter, the pipe run may also be formed exclusively with pipes 101 from the pipe store 51.

The buffer store 63 is preferably configured to accommodate residual pipe parts 102a, 102b of different pipe diameters.

Figure 2:
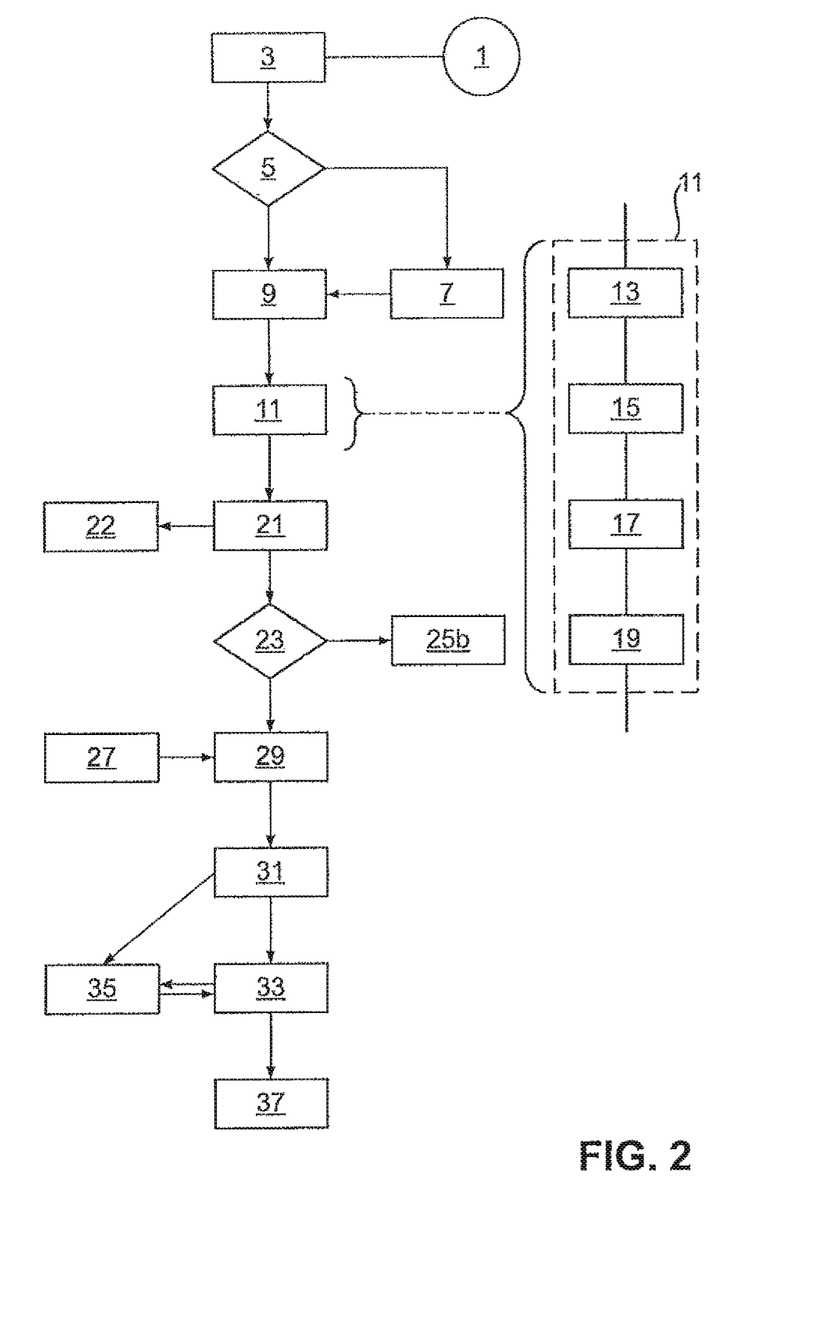
FIG. 2 shows a schematic flow diagram of the method according to the invention according to a preferred exemplary embodiment.

FIG. 2 shows the basic method sequence of the method according to the invention according to a preferred exemplary embodiment.

In a first step 1, an order is firstly issued to produce a predetermined number of pipes 100 with a predetermined diameter. Each of the pipes 100 to be produced has a designated length, which may differ from pipe to pipe or may also be identical.

After the order has been received, it is optionally ascertained in a next method step 3 how large the total length of all of the pipes 100 to be produced is and how many pipe parts 101 from the pipe store 51 are completed in order to complete the order.

If a residual pipe part 102 is still present in the buffer store 63, this is included in order to complete the order. Any residual pipe part still remaining completion of the order is finally fed to the buffer store 63 again.

If computer-aided order planning is used which calculates the raw material requirement, and if it is ascertained in a subsequent method step 5 that one or more residual pipe parts 102 of the predetermined pipe diameter are still in stock in the buffer store 63, the length of the residual pipe parts available in the buffer store 3 can be subtracted from the required total length. The result divided by the length of the pipe parts 101 situated in the pipe store 51 then gives the number of pipe parts 101 required from the pipe store 101.

If it is ascertained in method step 5 that one or more residual pipe parts 102 of the predetermined diameter are available in the buffer store 63, these are fed in a next method step 7 to the conveying section 61.

In addition, the required pipe parts 101 are fed in succession from the pipe store 51 to the conveying section 61 in a method step 9. If no residual pipe parts 102 of the predetermined diameter are available in the buffer store 63, the need for pipe parts for the order placed is covered exclusively with pipe parts 101 from the pipe store 51. The pipe parts 101 and any residual pipe parts 102 are, in a next step 11, fed to the welding station 53 and welded together.

After the welding, the pipe run 104 generated as a result of the welding is fed to the cutting station 55, and in a next method step 21 the pipes 101 are cut off from the pipe run 104 in the required, respectively designated lengths. If a residual pipe part 102 remains after the required number of pipes 100 has been cut off, this is fed to the buffer store 63 in a next method step 22.

After the cutting-off process, it is determined in a selection step 23 whether the cut-off pipes 100 can be directly transferred onward for surface enhancement or whether further welding steps, in particular the attachment of weld-on parts to the pipes, should take place first. If the pipes are to be processed further without weld-on parts, they are removed from the conveying section 63 after the cutting-off process from step 21 and, in a next method step 29, are prepared for the surface enhancement.

Figure 3:
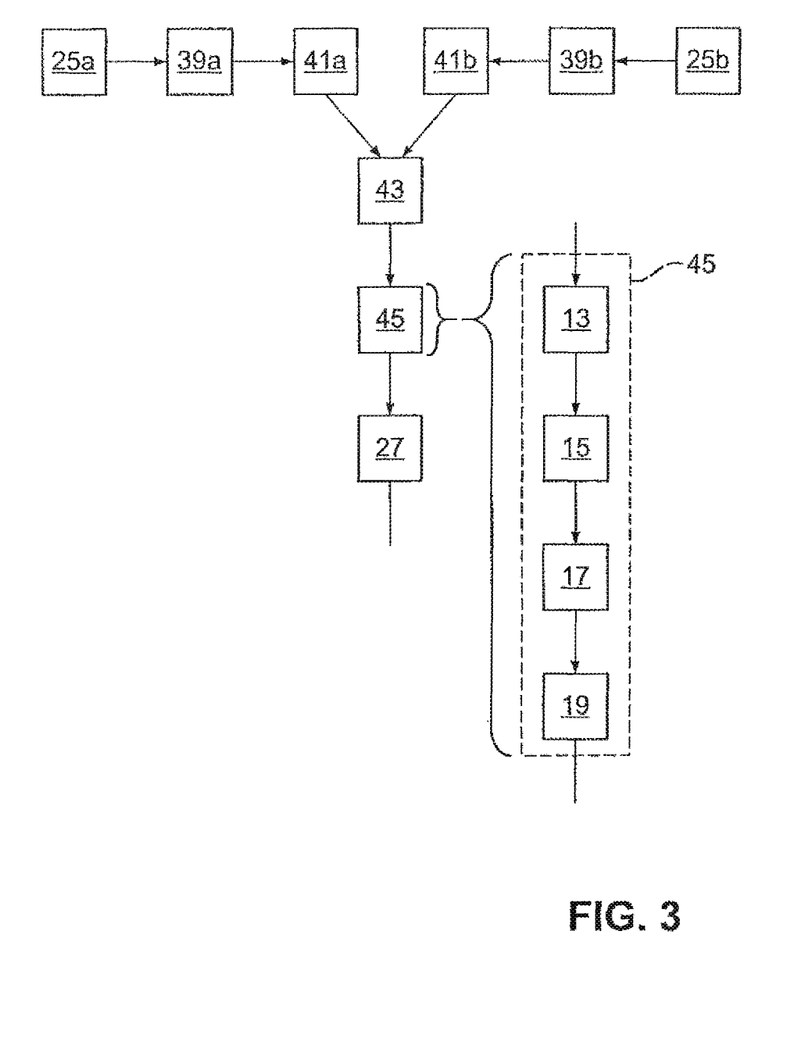
FIG. 3 shows a further schematic flow diagram of the method according to the invention as per FIG. 2.

If the selection is made that the cut-off pipes 100 are to be additionally processed further by attachment of further weld-on parts, these are fed as second hollow bodies to a method step 25b, cf. FIG. 3.

FIG. 3 schematically illustrates the additional attachment of weld-on parts to the pipes 100. Firstly, in steps 25a, 25b, a first hollow body, for example a pipe connector for receiving a sprinkler, and a pipe 100 generated from the pipe run 104 as a second hollow body, are provided. Following this, in a next method step 39a, b, edge surfaces are provided on the hollow bodies, preferably by means of plasma cutting. In steps 39a, b, the hollow bodies are provided with edge surfaces either on one or both of their end faces or on a wall section which is spaced apart from the respective end faces, said wall section being in the form of a cutout.

In a method step 41a, b that follows, the first and second hollow bodies are cleaned on the edge surfaces, preferably by means of a rotationally driven brush. If plasma cutting was used in the previous step to generate the edge surfaces, metal oxides and loose particles and burrs formed as a result of the brushing are removed as substantially as possible.

In a next method step 43, the first hollow body and the second hollow body are aligned with one another such that in each case one edge surface of one hollow body is aligned and arranged as closely adjacent as possible to a corresponding edge surface of the respective other hollow body. The alignment of the hollow bodies with respect to one another may be performed manually or by means of a single-jointed or multi-jointed robot.

In a next method step 45, the previously aligned hollow bodies are welded to one another along the mutually aligned encircling edge surfaces, such that a fully encircling weld seam is generated which has a root extending on the inside of the pipe. A single-layer weld seam is preferably applied.

Following the welding, the hollow bodies that have been welded together are, as tubes with weld-on parts, fed back to the method sequence in a method step 27 through which the tubes 100 without weld-on parts also pass.

In a method step 29, which in turn may have multiple substeps that are not illustrated in any more detail, the pipes 100 are prepared for the subsequent coating. The preparation comprises the cleaning of the pipes in one or more dip baths in which, for example, pickling or rinsing media such as demineralized water can be stored. The exact number and arrangement of the preparatory steps depends on the specifications of the coating material to be used.

The hollow bodies prepared in step 29 are then chemically coated in a next method step 31 in one or more dipping operations by means of an autodeposition method. The result of the dipping is that the entire inside including the weld seam, but also the outside of the hollow bodies, is substantially completely coated.

Following the coating of the hollow bodies and of the weld seam with the polymer-based layer, a thermal aftertreatment process takes place in a step 33. The step 33 may include one or more substeps, in each of which a flash-off or tempering with predetermined temperatures and tempering periods is performed (low-temperature tempering or high-temperature tempering). Optionally, the pipes coated and aftertreated in this way, which have been generated from the pipe parts, may be powder-coated in a step 35. The powder coating is also preferably cured again in a drying process in step 33.

Subsequently, in step 37, the pipe is conveyed out of the production process and is ready for use.

The method step 33 for the thermal aftertreatment of the pipes is shown as a single step for the sake of simplicity. It is however possible for multiple successive heat treatment stages to be performed in step 33, which are performed in one or in multiple different devices.

The welding processes according to steps 11, 45 may for example be optimized in that, in a measuring step 13, which may be performed at any time between steps 7, 9 and 25a, b respectively and the respective welding step 11, 45, the diameters of the pipe parts and the wall thicknesses of the pipe parts, in particular in the region of the edge surfaces, are measured.

Optionally, a measurement is carried out online, for example optically by means of gap detection, directly in the method step of the edge surface generation, and, on the basis of the measured variables, the welding parameters are then adapted online in order to compensate for any ascertained deviations of the measured geometry from the starting geometry for which the original welding parameters were stored. This makes it possible for the effects of the deviations, for example any out-of-roundness of the hollow body, to be compensated in the welding process itself.

Depending on the measured parameters, a parameter set for optimal application of the weld seam is preferably selected in a method step 15 from a predefined value table. The parameters that are stored in the predefined value table for each diameter and each wall thickness preferably comprise the feed rate, the material of the welding filler metal, and the type of welding. If, for example, arc welding is selected as the welding type, the parameters of the welding tool 55 also include the voltage, the feed rate of the welding wire, etc.

In a subsequent step 17, the previously determined parameters are preferably read into the welding tool or, if welding is to be performed manually, provided to the operator in order that the welding of the first and second hollow bodies to one another can be performed in the subsequent step 19.

Figure 4:
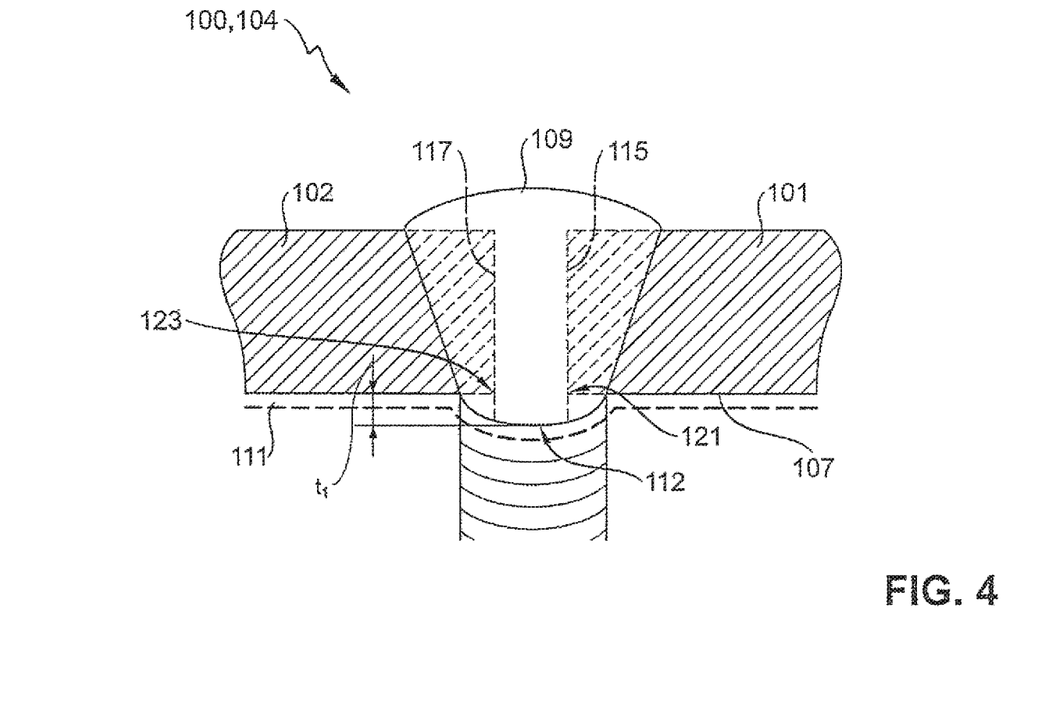
FIG. 4 shows a schematic partial illustration of a pipe according to a preferred exemplary embodiment.

FIG. 4 illustrates a pipe 100 or optionally a part of the pipe run 104 in the region of the encircling weld seam 109 generated in the welding station 51. The pipe parts 101 and 102 are arranged coaxially with respect to one another and axially adjacent to one another. In the non-welded state, the pipe parts 101 and 102 each have an edge surface 115, 117 facing toward the other pipe part. After the weld seam 109 has been applied according to the invention, a root 112 of the weld seam 109 extends in fully encircling fashion in a circle within the pipe run 104 or pipe 100.

In the non-welded state, the edge surfaces 115, 117 are still each delimited by an encircling inner edge 121, 123. The encircling inner edges 121, 123 are completely encompassed by the root 112 of the weld seam 109 in the welded state. Instead of an angular, sharp transition between the pipe parts 101, 102, the root 112 of the weld seam now forms a relatively smooth transition. Here, the root 112 of the weld seam 109 protrudes radially within the wall 107 of the pipe 100 or pipe run 104 by a predetermined maximum value t1. The extent to which the root 112 protrudes inward is determined from the pipe diameter of the pipe parts 101, 102, the material thickness of the wall 107, and the welding parameters of the welding tool 55.

In the course of preliminary tests, it is ascertained for the predetermined pipe diameter what welding parameters can be used to form the root 112 with the desired depth t1, see above. Depending on what pipe diameter is present for the respectively present order, the suitable parameter set is selected from the list determined in advance and the welding process is carried out therewith. The procedure is basically the same irrespective of whether the welding is performed in automated, partially automated or manual fashion.

Furthermore, in FIG. 4, reference designation 111 indicates the polymer-based protective layer applied to the inside of the pipe 100 at the end of the method, which protective layer has the characteristics described above in the general part. In the interior of the pipe 100, the pipe 100 has a polymer-based layer 111 which extends all the way along the insides of the hollow bodies 101, 102 and which also at any rate completely covers the encircling weld seam 109 on the inside of the pipe 100. If the pipe has been coated in a dipping process, the outer surface of the first and second hollow bodies 101, 102 and the weld seam 109 are at least substantially also covered by the polymer-based layer.

The invention claimed is:

1. A method for producing a number of polymer-enhanced pipes with a predetermined pipe diameter, comprising:
feeding multiple pipe parts with a predetermined pipe diameter to a welding station,
aligning in each case a first pipe part and a second pipe part coaxially with respect to one another and axially adjacent to one another,
welding the pipe parts by a fully encircling weld seam to form a pipe run,
conveying the pipe run to a cutting station in a machine direction downstream of the welding station,
cutting off a number of pipes in a respectively designated length from the pipe run; and
applying a polymer-based layer on an inside of the pipes, wherein the polymer-based layer completely covers the inside of the pipes and a root of the weld seam;
wherein the applying comprises:
coating by chemical autodeposition and dipping of the pipes into a dip bath which contains a polymer-based chemical autodeposition material;
wherein the pipe parts are formed from a metal suitable for chemical autodeposition including a ferrous and/or zinc-containing metal, and
wherein the autodeposition material comprises polymer constituents which are ionically bonded to a wall of the pipe parts and to the root of the weld seam, and is present as an aqueous emulsion or dispersion.

2. The method as claimed in claim 1, wherein, after the cutting off of the number of pipes, a residual pipe part remains, and the method comprises:
transferring the residual pipe part into a buffer store.

3. The method as claimed in claim 1, wherein at least one of the first and second pipe parts is guided from a pipe store to the welding station.

4. The method as claimed in claim 3, comprising the step:
checking whether a residual pipe part of the predetermined diameter is available in a buffer store, and
if so: feeding the at least one of the first and second pipe parts from the pipe store and feeding the residual pipe part from the buffer store to the welding station.

5. The method as claimed in claim 4, wherein the method is carried out in batch-based fashion, wherein a batch run comprises a designated number of pipes to be produced, and the method comprises:
determining a total length of the designated number of pipes,
determining a length of the residual pipe part in the buffer store, if present, and
determining a required quantity of pipe parts to be fed from the pipe store as:
total length of the designated number of pipes minus the length of the residual pipe part, divided by a predefined pipe length of the pipe parts in the pipe store.

6. The method as claimed in claim 1, wherein the wall of each of the pipe parts comprises an encircling edge surface, and the aligning comprises:
aligning the encircling edge surface of the first pipe part and the encircling edge surface of the second pipe part with one another,
and the welding comprises:
welding the first pipe part to the second pipe part along the encircling edge surfaces, wherein the fully encircling weld seam is generated which comprises the root extending on the inside of the pipe run.

7. The method as claimed in claim 6, wherein each of the encircling edge surfaces of the first pipe part and of the second pipe part comprise an encircling inner edge, and the welding comprises:

forming the root of the weld seam with a thickness that completely encompasses both encircling inner edges,
wherein the root of the weld seam protrudes radially inward from an inside of the wall of the first and/or second pipe part by a predetermined maximum value, wherein the predetermined maximum value amounts to 0.7 times the wall thickness of the pipe parts or less.

8. The method as claimed in claim 7, wherein the cutting off comprises:
generating at least one edge surface of a residual pipe part by plasma cutting.

9. The method as claimed in claim 6, furthermore comprising:
cleaning the edge surfaces before the welding.

10. The method as claimed in claim 9, wherein the cleaning comprises removing metal oxides and loose particles from the at least one edge surface by brushing.

11. The method as claimed in claim 1, wherein the autodeposition material is acidic, and comprises a starter material in the form of metal halides by which the polymer constituents are destabilized.

12. The method as claimed in claim 1, wherein the autodeposition material comprises, as polymer constituent, autodepositionable polymers selected from the list comprising:
i) epoxides,
ii) acrylates,
iii) styrene acrylates,
iv) epoxy acrylates,
v) isocyanates, urethanes, or polyurethanes,
vi) polymers with a vinyl group or polyvinylidene chloride, or
iv) a combination of two or more of i), ii) or iii), which are crosslinked to one another via an isocyanate or via a urethane.

13. The method as claimed in claim 1, wherein the dipping of the pipes is performed in one or more dipping processes and is continued until such time as the polymer-based layer applied to the inside of the pipes comprises a thickness in a range from 7 µm to 80 µm.

* * * * *